(12) United States Patent
Koibuchi et al.

(10) Patent No.: US 7,073,621 B2
(45) Date of Patent: Jul. 11, 2006

(54) VEHICLE STEERING CONTROL DEVICE (75) Inventors: Ken Koibuchi, Susono (JP); Yoshiaki Tsuchiya, Nishikamo-gun (JP); Taro Hirose, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 246 days.

(21) Appl. No.: 10/706,096

(22) Filed: Nov. 13, 2003

(65) Prior Publication Data
US 2004/0099469 A1 May 27, 2004

(30) Foreign Application Priority Data
Nov. 26, 2002 (JP) .................. 2002-342600

(51) Int. Cl.
*B62D 6/00* (2006.01)

(52) U.S. Cl. .................. 180/421; 180/446; 701/42; 701/72

(58) Field of Classification Search ............. 180/421, 180/446, 197; 701/41–43, 71–75
See application file for complete search history.

(56) References Cited

U.S. PATENT DOCUMENTS

| 5,316,379 A | 5/1994 | Becker et al. |
| 6,062,336 A | 5/2000 | Amberkar et al. |
| 6,789,008 B1 * | 9/2004 | Kato et al. ............ 701/41 |
| 6,909,957 B1 * | 6/2005 | Suissa ............ 701/82 |

FOREIGN PATENT DOCUMENTS

| EP | 0 296 756 A2 | 12/1988 |
| EP | 1 209 053 A1 | 5/2002 |
| FR | 2 821 044 | 8/2002 |
| JP | A 64-4577 | 1/1989 |
| JP | B2 2861561 | 12/1998 |
| JP | A 2001-80535 | 3/2001 |
| JP | A 2001-334947 | 12/2001 |
| WO | WO 02/34599 A1 | 5/2002 |
| WO | WO 02/074638 A1 | 9/2002 |
| WO | WO 2004/005093 A1 | 1/2004 |

* cited by examiner

*Primary Examiner*—Anne Marie Boehler
(74) *Attorney, Agent, or Firm*—Oliff & Berridge, PLC (57) ABSTRACT

A new and novel device for controlling a steering characteristic of a vehicle such as automobile so as to enhance an effect of suppressing a change in a behavior of the vehicle body due to a difference between driving and braking forces on the left and right wheels is characterized in that the device makes an amount of controlling the steering characteristic smaller as an index indicating an amount of a shift of vertical loads between the left and right wheels is increased. The steering characteristic is modified through controlling steering assist torque or a steering angle of the steered wheels. The steering assist by the steering control device is fully effective when the vehicle is running on a straight road having surfaces of different frictional coefficients while less effective on a curved road having a uniform frictional surface, preventing undesirable and unexpected modification of the steering characteristic during turning of the vehicle.

11 Claims, 6 Drawing Sheets

VEHICLE STEERING CONTROL DEVICE

BACKGROUND OF THE INVENTION

1. Field of the Invention

The present invention relates to a device for controlling steering characteristics (i.e. handling characteristics) of a vehicle such as an automobile, and more specifically, to such a device that suppresses disturbances in the behavior or posture of the vehicle due to differences between driving and braking forces on the left and right wheels.

2. Description of Prior Art

In a modern power steering system equipped on a vehicle, a steering control device controls steering torque, applied to steered wheels, based upon parameters of a running condition of the vehicle, such as a vehicle speed. So far, in addition to the purpose of the reduction of a force required for rotating the steering wheel of the driver of the vehicle, steering control devices are variously designed so as to provide comfortableness and safety in driving a vehicle for the driver. Some steering control devices serve for assisting the driver of a vehicle in tracking a course of travel of the vehicle while keeping a stable running behavior or posture of the vehicle. For instance, European Patent No. 0 296 756 describes a steering control device, which adjusts a force produced by, and/or a ratio of, a steering gear as a function of differential rotational velocity of two or more wheels and a position of a steering gear, providing enhanced handling in events that the left and right wheels each have different conditions. Japanese Patent Laid-Open Publication No. 2001-334947 shows a steering control system operating in response to a difference between the left and right wheel velocities, in which system, upon braking the vehicle, the angle of a steering gear is automatically biased toward the side of the smaller wheel velocity. Japanese Patent No. 2861561 and Japanese Patent Laid-Open Publication No. 2001-80535 each describe a control device adjusting steering assist torque based upon braking and/or traction forces generated on the left and right wheels. The above-described control devices, in general, compensate, by imparting steering assist torque and/or controlling the steering angle of a vehicle, for imbalance of forces of different magnitudes generated on individual wheels or tires under the control of Traction control (TRC) device and/or Anti-skid control (ABS) device, such as when the vehicle is running on a road surface having different frictional coefficients, e.g. dried in one side and wet or frozen in the other side.

Steering control devices in the prior art, taking into account the force balance between left and right wheels, can effectively assist in suppressing disturbance in the posture of a vehicle due to the force imbalance when the vehicle is running along a straight course. Under the control of those steering control devices, steering assist torque is produced or increased in a direction against a yaw moment induced on a vehicle body by a difference between forces on the left and right wheels. That is, when a vehicle is accelerated (decelerated) on a road surface having different frictional coefficients on which a yaw moment induced by traction (braking) forces on the wheels tends to turn the vehicle body to the lower (higher) frictional side, the steering assist torque will be given or increased in the direction suppressing the turning of the vehicle body. Alternatively, the steering angle of the vehicle is directly controlled so as to generate a yaw moment for maintaining a stable posture of the vehicle against a yaw moment induced by the traction or braking forces on the wheels. Accordingly, the steering assist torque (and/or the steering angle control) will lighten the burden of steering his handle, imposed on the driver, for stabilizing the vehicle posture and keeping the straight course of travel of the vehicle.

However, the steering assist torque and steering angle control (Steering Assist Control) as described above do not always support the driver's steering operation: it would deteriorate the steering characteristic of a vehicle when the vehicle is turning or running in a curved course. During turning of a vehicle, because of the centrifugal force, vertical loads become higher on the turning outer wheels, so that the road reaction (traction and braking) forces on the turning outer wheels become higher than those on the turning inner wheels. This distribution of the road reaction forces is similar to that in a vehicle running on the surface having different frictional coefficients: the forces on the wheels in one side are higher than in the other side. Thus, the steering control devices in the prior art produce or increase the steering assist torque or the steering angle in the direction of suppressing yaw moment induced by the road reaction forces even on a road surface of a uniform frictional characteristic.

During turning of a vehicle, a yaw moment turning the vehicle head along the curved course, i.e. from the turning outside to the turning inside is required. In the prior art, however, the steering assist torque in accelerating the vehicle is generated in the direction from the turning inside to the turning outside, opposite to the required yaw moment, because the traction forces on the wheels are higher in the turning outside. Thus, the steering assist torque produced or increased under the control of the prior device increases the force required for rotating the steering wheel, leading to a failure of steering of the driver and undesirable increase in the turning radius due to the reduction of the steering angle (Deterioration of the turning ability of the vehicle). On the other hand, the steering assist torque during decelerating of the vehicle under the control of the prior device is generated or increased in the same direction as the required yaw moment for turning the vehicle body. Because of the addition or increase of the steering assist torque to the total steering torque, however, the force for rotating the steering wheel is made smaller unexpectedly for the driver, which could induce an excessive rotation of the steering wheel, leading to the undesirable reduction of the turning radius (Reduction of the turning stability of the vehicle). Similar phenomena would occur under the steering angle control in the prior art. In other words, the steering assist control in the prior art is unexpectedly operated to bias the steering torque and/or steering angle during turning of a vehicle, because it is basically based upon only the driving and braking forces on the wheels.

In a steering assist control, undesirable and unexpected assist operation modifying a steering characteristic of a vehicle should be avoided. During turning of a vehicle in a curved course, especially, the driver should feel an appropriate load or force in turning his vehicle in order to prevent failing to track the driving course. Thus, the conventional steering control devices may be improved more appropriately.

SUMMARY OF INVENTION

According to the present invention, there is provided a novel vehicle steering control device for assisting a driver's steering operation, restricting undesirable and unexpected modification of a steering characteristic of a vehicle, especially during turning of the vehicle.

In one aspect of the present invention, in a device for controlling a steering characteristic of a vehicle so as to enhance an effect of suppressing a change in a behavior of the vehicle due to a difference between driving and braking forces on the left and right wheels, it is characterized that an amount of controlling the steering characteristic is made smaller as an index indicating an amount of a shift of vertical loads between the left and right wheels of the vehicle is increased. Accordingly, the vehicle has at least one pair of left and right steered wheels, a steering wheel and a steering apparatus, such as a steering gear, operated based upon a motion of the steering wheel and a control of the device.

As described above, in a turning vehicle, the vertical load on the wheel is larger in the turning outside than in the turning inside because of the centrifugal force (vertical load shift between left and right wheels). On the other hand, however, in a vehicle running on surface having different frictional coefficients, no such vertical load shift occurs. Thus, in the present invention, when an index indicating an amount of a shift of vertical loads between the left and right wheels is increased, the control or modification in the steering characteristic is made less effective, and thereby suppressing any effect of undesirable and unexpected steering assist control and preventing the deterioration of the turning ability and reduction of the turning stability of the vehicle.

In the above-mentioned device of the present invention, the amount of controlling the steering characteristic may be controlled by controlling a steering assist torque, which will be made smaller in response to the increase of the index of the vertical load shift during the turning of the vehicle. Thus, the present invention effectively avoid undesirable and unexpected generation or increase of the steering assist torque occurring in the prior art. In this case, in particular, steering assist torque may be a sum of a basic steering assist torque, determined from torque applied to the steering wheel (or an output from an steering handle means of the driver), and an auxiliary steering assist torque for canceling the yaw moment induced by the difference between the longitudinal road reaction (traction and braking) forces on the left and right wheels. The auxiliary assist torque may be suppressed or reduced in response to the increase of the index of the vertical load shift.

Further, in the present invention, the amount of controlling the steering characteristic may be controlled by controlling a steering angle of a steered wheel, instead of or together with the control of the steering assist torque, and thereby suppressing undesirable and unexpected steering angle control for a steering assist control. In this case, an active steering apparatus may be provided for changing the steering angle under the control of the steering control device, irrespective of the driver's steering operation. The contribution of the active steering apparatus to the steering angle may be made less effective in response to the increase of the index of the vertical load shift.

As the index of the vertical load shift, a yaw rate, a lateral acceleration of the vehicle body, the steering angle, an angler position of the steering wheel, the difference between the vertical loads on the left and right wheels and a combination thereof may be selected.

Alternatively, in another aspect of the present invention, in a device for controlling a steering characteristic of a vehicle, the amount of controlling the steering characteristic may be made smaller as an index indicating a degree of turning of the vehicle increases.

In one embodiment, the device according to the present invention may be equipped on a vehicle having TRC system, in which any driven wheel, if its traction slip is excessive, is partially braked for ensuring the frictional force against a road surface. In such a case, the steering characteristic may be controlled based upon the difference between the traction forces, estimated from the difference between the braking forces, on the left and right driven wheels. Further, the vehicle may be provided with ABS system, in which a braking pressure applied to a wheel is suppressed if its braking slip is excessive. The braking pressures applied to the individual wheels may be used for estimating the longitudinal road reaction forces on the wheels as described below in detail.

Thus, it is an object of the present invention to provide new and novel steering control devices for a vehicle such as automobile, which devices control a steering characteristic of the vehicle in order to stabilize the behavior or posture of the vehicle while keeping the course of travel of the vehicle.

It is another object of the present invention to provide such devices wherein a steering characteristic of the vehicle is improved when the longitudinal road reaction forces on the left and right wheels are different from each other due to variation in road frictional coefficients, but less modified during turning of the vehicle for ensuring steering controllability.

It is a further object of the present invention to provide such devices wherein, for improvement of the steering characteristic, steering assist torque or a steering angle is controlled as a function of an index of the vertical load shift between the left and right wheels of the vehicle as well as the difference between the longitudinal road reaction forces on the left and right wheels.

It is a further object of the present invention to provide such devices that ensure the driver's appropriate feeling, safety and easiness in his steering operation of a vehicle during turning as well as during running on a surface having different frictional coefficients.

It is another object of the present invention to provide such devices wherein undesirable and unexpected modification of the steering characteristic is avoided especially during turning of the vehicle.

It is another object of the present invention to provide such devices preventing the course-out of the vehicle due to the driver's failing to execute an appropriate steering operation.

Other objects and advantages of the present invention will be in part apparent and in part pointed out hereinafter.

BRIEF DESCRIPTION OF THE DRAWINGS

In the accompanying drawings.

DESCRIPTION OF PREFERRED EMBODIMENTS

Figure 1A:
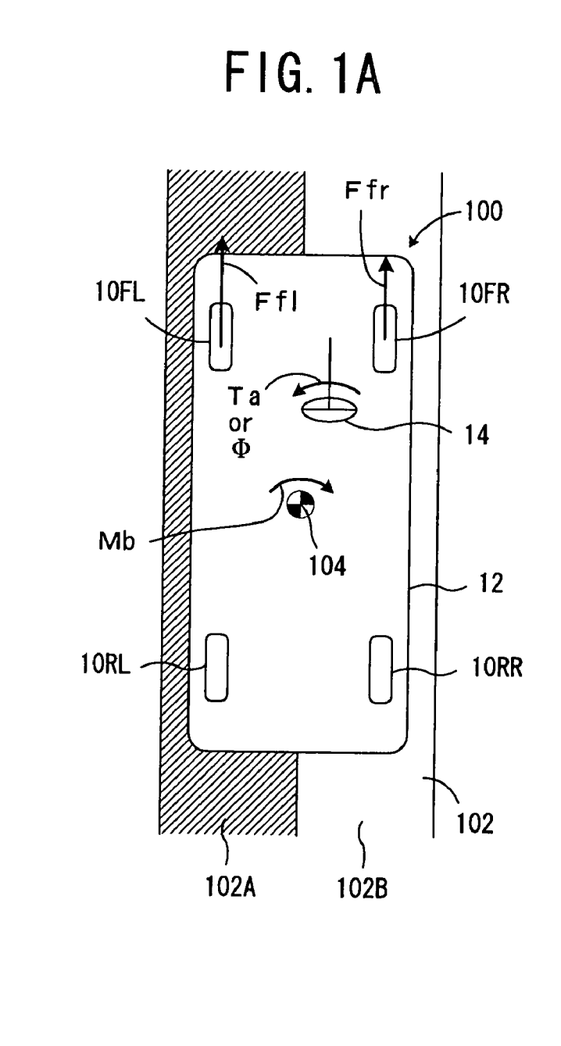
FIG. 1A is a schematic drawing of a vehicle accelerated on a straight road having higher (left) and lower (right) frictional surfaces.
Figure 1B:
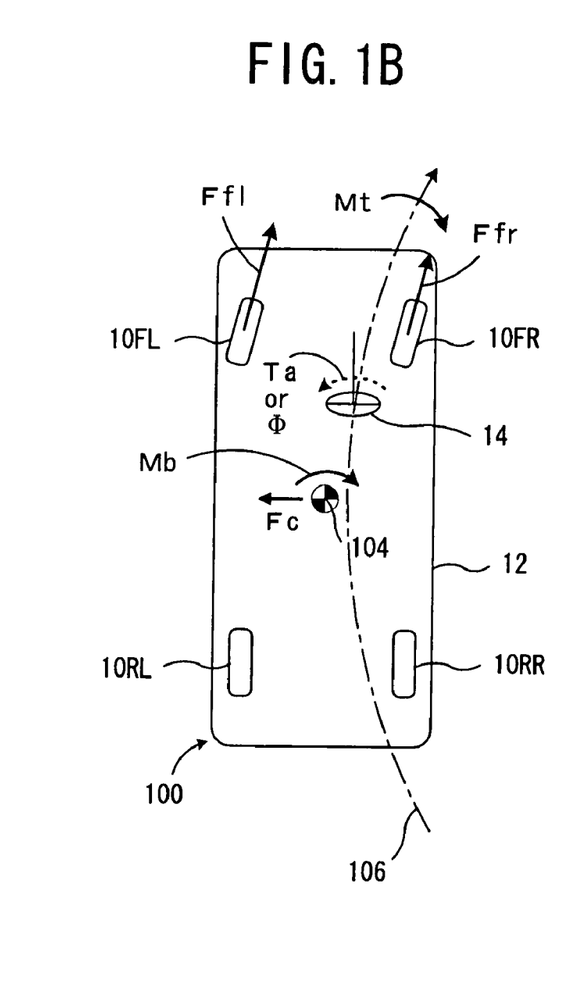
FIG. 1B is a schematic drawing of a vehicle accelerated on a curved road having a uniform frictional surface.
Figure 2A:
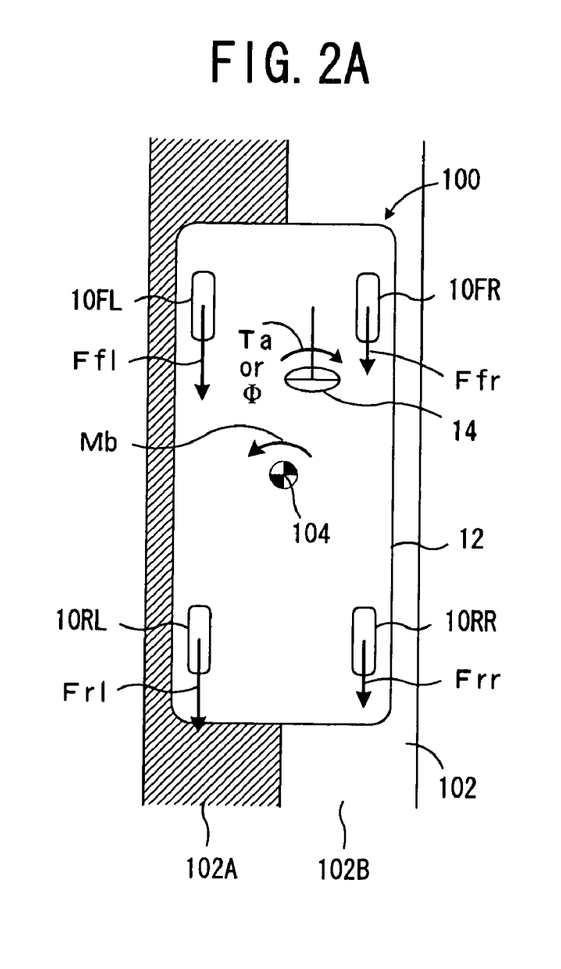
FIG. 2A is a schematic drawing of a vehicle decelerated on a straight road having higher (left) and lower (right) frictional surfaces.
Figure 2B:
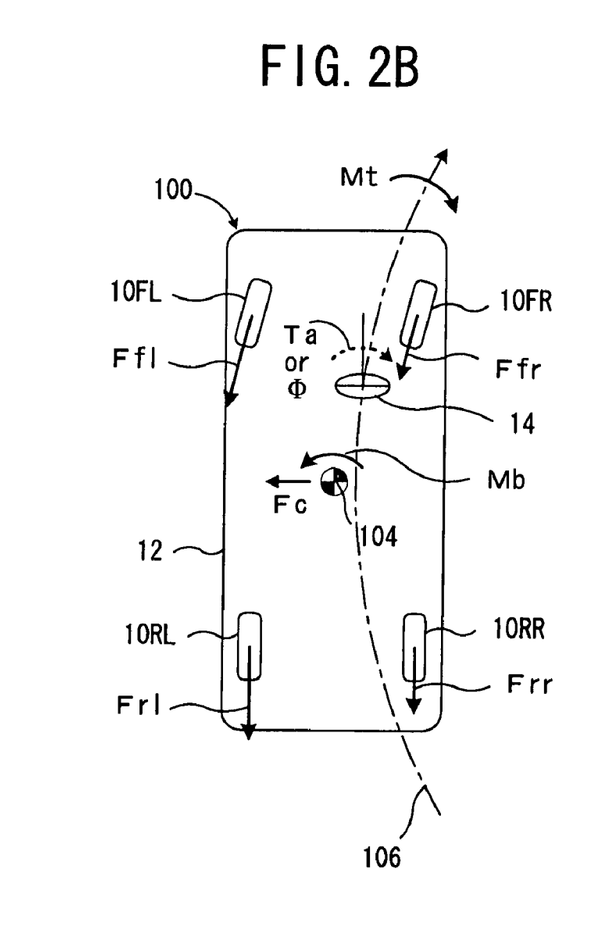
FIG. 2B is a schematic drawing of a vehicle decelerated on a curved road having a uniform frictional surface.

FIGS. 1 and 2 illustrate conditions of a four-wheeled, front-wheel drive vehicle 100 in which a vehicle steering control device of the present invention is to be operated. The vehicle 100 may be equipped with an electrical or hydraulic power steering system (only the steering wheel 14 is symbolically shown in the drawing). The steering control device according to the present invention controls steering assist torque, applied to a steering gear or apparatus, or the steering angle of the steered (front) wheels of the vehicle, as a function of an index of vertical load shift between the left and right wheels, as well as a difference of longitudinal forces on the wheels, as described later in more detail. The vehicle 100 may be equipped with TRC system, adjusting an acceleration slip for ensuring an appropriate traction or driving force for each driven (front) wheel, and/or Anti-skid control (ABS) system, suppressing a braking (wheel cylinder) pressure for a wheel, if its braking slip ratio is excessive, for ensuring an appropriate braking force.

Referring to FIG. 1A, the vehicle 100 is accelerated along a straight course 102, where wheels or tires 10FL, FR, RL and RR (front left, front right, rear left and rear right, respectively) of the vehicle 100 are simultaneously reacted on surfaces having different frictional coefficients, such as when one side of the road surface is dried and the other side wet or frozen, etc. In the example of FIG. 1A, the frictional coefficient in the left half 102A is higher than in the right half 102B so that the traction force Ffl on the left driven wheel is larger than that Ffr on the right driven wheel. This force imbalance between the left and right wheels induces a yaw moment Mb, around the centroid of the vehicle body 104, turning the vehicle head from the higher frictional side (left) 102A to the lower frictional side (right) 102B, destabilizing the posture of the vehicle and imposing on the driver a task of rotating the steering wheel (from the right to the left) though the vehicle runs in the straight course. Thus, in order to cancel the undesirable yaw moment Mb, the steering control device automatically produces the steering assist torque, Ta, and/or moves the steering angle, Φ, in the direction (as shown by an arrow around the steering wheel 14) opposite to the yaw moment Mb, irrespective of the driver's steering operation.

Similarly, in FIG. 2A, the vehicle 100 is decelerated on a straight road 102 similar to as shown in FIG. 1A, and the braking forces Ffl, Frl on the wheels 10FL, RL in the higher frictional side 102A is larger than in the other side 102B, inducing a yaw moment Mb, which turns the vehicle head from the lower frictional (right) side to the higher frictional (left) side. Thus, in order to cancel this undesirable effect of turning the vehicle head, the steering control device of the present invention automatically produces the steering assist torque, Ta, and/or moves the steering angle, Φ, in the direction (as shown by an arrow around the steering wheel 14) opposite to the yaw moment Mb, irrespective of the driver's steering operation. In other words, in the conditions as shown in FIGS. 1A and 2A, the steering characteristic of the vehicle is modified, dependent upon the difference between the longitudinal road reaction forces on the left and right wheels.

In FIG. 1B, on the other hand, the vehicle 100 is accelerated while turning rightward on a road surface of substantially uniform friction along a curved course 106, where a yaw moment Mt is required for turning the vehicle head from the turning outside to the turning inside. In this case, because of the centrifugal force Fc, the vertical load on the turning outside (left) wheel is increased and that on the turning inside (right) wheel is decreased (the vertical load of the vehicle 100 is shifted to the turning outside), and thereby making the traction forces Ffl on the left wheel large relative to that Ffr on the right wheel. Thus, the steering control device, if in response to this force imbalance only, would increase the steering assist torque Ta or steering angle Φ against the yaw moment Mb induced by the difference between the traction forces on the left and right wheels as described above. In this steering assist control as shown in FIG. 1A, however, the steering assist torque, Ta, or steering angle, Φ, would be increased in the direction (as shown in an phantom arrow) opposite to the yaw moment Mt required for turning the vehicle along the curved course 106, undesirably increasing a force of rotating the steering wheel 14 of the driver. Thus, in the steering control device according to the present invention, when the increase of the vertical load shift is detected, the increase of the steering assist torque, Ta, or steering angle, Φ, is suppressed, so that undesirable modification of steering characteristic of the vehicle is prevented during turning of the vehicle.

Similarly, as shown in FIG. 2B, when the vehicle 100 is decelerated on a curved road 106 of uniform friction, the steering control device of the present invention also suppresses the increase of the steering assist torque Ta or steering angle Φ in the direction (as shown in a phantom arrow around steering wheel 14) of canceling the yaw moment Mb induced from the difference between the braking forces on the left and right wheels. In this case, the braking forces Ffl and Frl on the turning outside (left) wheels 10FL and 10RL are increased because of the vertical load shift Fc, so that the steering assist torque or steering angle under the steering assist control only based upon the braking forces on the individual wheels would be increased in the same direction of the required yaw moment Mt, unexpectedly reducing the force required for rotation of the steering wheel. Since the driver should feel an appropriate load or force in turning his vehicle in order to prevent from failing to track the driving course, the automatic increase of steering assist torque or steering angle, unexpected for the driver, should be avoided. Thus, the steering control device reduces the amount of the automatic modification of the steering assist torque and steering angle in both acceleration and deceleration of a vehicle during turning.

Figure 7:
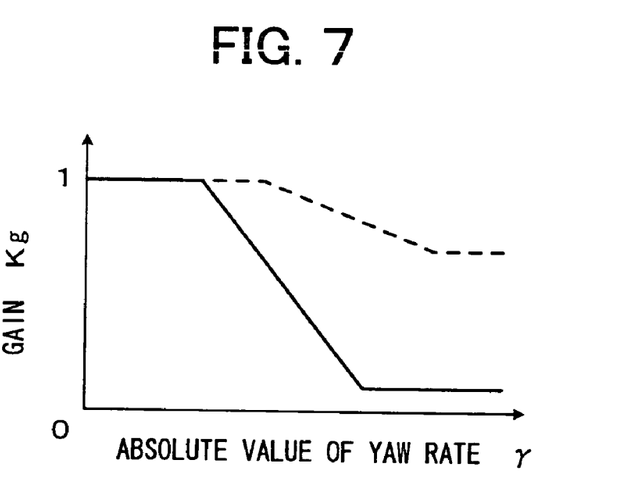
FIG. 7 shows maps of the gain Kg as a function of the yaw rate of the vehicles used in step 70 of the flowchart of FIG. 5.

When the steering characteristic of a vehicle is controlled with steering assist torque Ta, it may be determined as follows:

$$Ta = Tab + Kg \cdot Tca, \tag{1}$$

where Tab is a basic steering assist torque, i.e. a torque component determined by torque of the rotation, or an angular position, of the steering wheel by the driver (steering assist torque in a normal power steering system); Tca, an auxiliary steering assist torque, i.e. a torque component determined by the difference between longitudinal road reaction forces on the left and right wheels or a yaw moment induced by those forces; and Kg, a positive variable gain which is reduced as an index indicating the vertical load shift during turning of the vehicle increases. Kg may be determined according to a map as shown in FIG. 7 as described later in more detail. Because of the reduction of Kg, the contribution of Tca to Ta will be reduced during turning of a vehicle. Tca may be determined in any of ways known in the art. Preferable examples of the way of determining Tca will be described later.

Similarly, when the steering characteristic is controlled with the steering angle Φ, it may be determined as follows:

$$\Phi=\Phi ab+Kg\cdot\Phi ca, \quad (2)$$

where Φab is a component determined by the amount of rotation of the steering wheel by the driver; Φca, an auxiliary component determined by the difference between longitudinal road reaction forces on the left and right wheels or a yaw moment induced by those forces irrespective of the driver's steering operation; and Kg, a positive variable gain which is reduced as an index indicating the vertical load shift during turning of the vehicle increases.

It should be noted that the gain, Kg in the expressions (1) and (2), may be reduced in response to increasing of an index indicating a degree of turning of a vehicle such as a yaw rate of a vehicle, a rotational position of the steering wheel, etc.

In the followings, more practical embodiments realizing the present invention are described.

Figure 3:
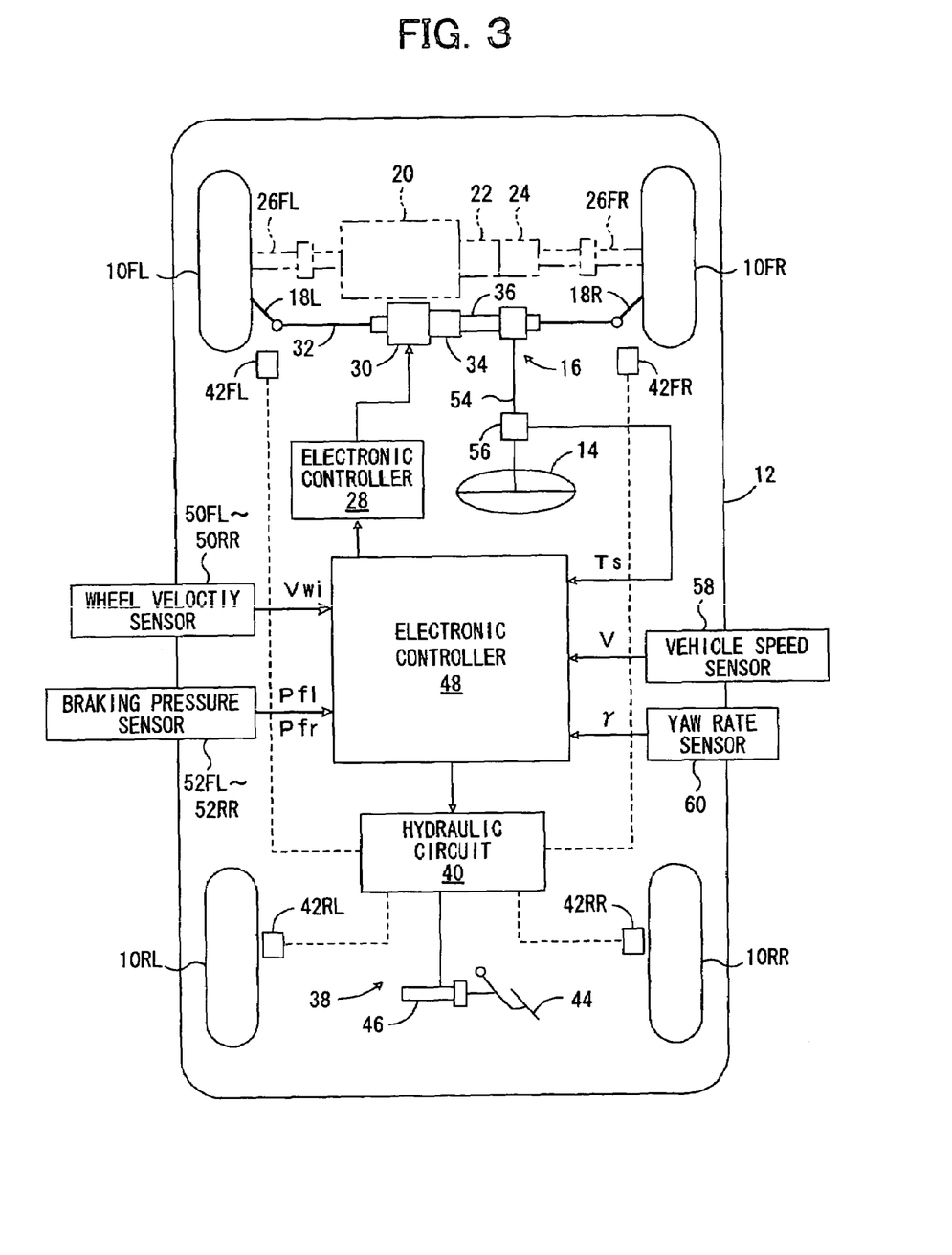
FIG. 3 is a diagrammatical view of one embodiment of a four wheeled, front drive vehicle incorporating a vehicle steering control device controlling the steering assist torque according to the present invention.

FIG. 3 diagrammatically shows one embodiment of a four-wheel, front drive vehicle incorporating a steering control device according to the present invention, in which steering assist torque is controlled for improving a steering characteristic. The vehicle includes a vehicle body 12, front right wheel 10FR, front left wheel 10FL, rear right wheel 10RR and rear left wheel 10RL supporting the vehicle body 12 via the respective suspension means (not shown in the figure). The rear wheels are non-driven wheels. The front right and front left wheels 10FR and 10FL are steered by an electric power steering apparatus 16 of a rack-and-pinion type according to a rotation of a steering wheel 14 by a driver via a pair of tie rods 18R and 18L. The vehicle is also provided with an engine 20 adapted to output a driving torque according to a throttle valve opening in response to the depression of an acceleration pedal by the driver, a hydraulic torque converter 22 and an automatic transmission 24 transmitting a rotational driving force from the engine 20 to the front wheels 10FL and 10FR through a differential gear system (not shown) and driving shafts 26FL and 26FR, respectively.

The electric power steering apparatus 16, more in detail, may be of a type of rack common axle in which rotational torque generated by an electric motor 30 is converted into a reciprocal force for a rack bar 32 by e.g. a ball and screw type converter apparatus 34. The steering assist torque for lightening the load of rotating the steering wheel 14 is generated by an auxiliary steering force driving the rack bar 32 relative to a housing 36 under the control of an electronic controller 28.

A brake system, generally designated by 38, includes a hydraulic circuit 40, a brake pedal 44 adapted to be depressed by the driver, a master cylinder 46 for supplying a master cylinder pressure to the hydraulic circuit means 40 according to the depression of the brake pedal 44 by the driver, and wheel cylinders 42FR, 42FL, 42RR and 42RL each adapted to apply a braking force to each corresponding one of the wheels 10FL–10RR according to a supply of a hydraulic pressure thereto from the hydraulic circuit means 40. The braking forces on the individual wheels may be controlled by controlling the corresponding brake pressures according to an electronic controller 48 as described later in more detail. The hydraulic circuit means 40 also has connection with an oil reservor, an oil pump, etc. and various valves.

Figure 5:
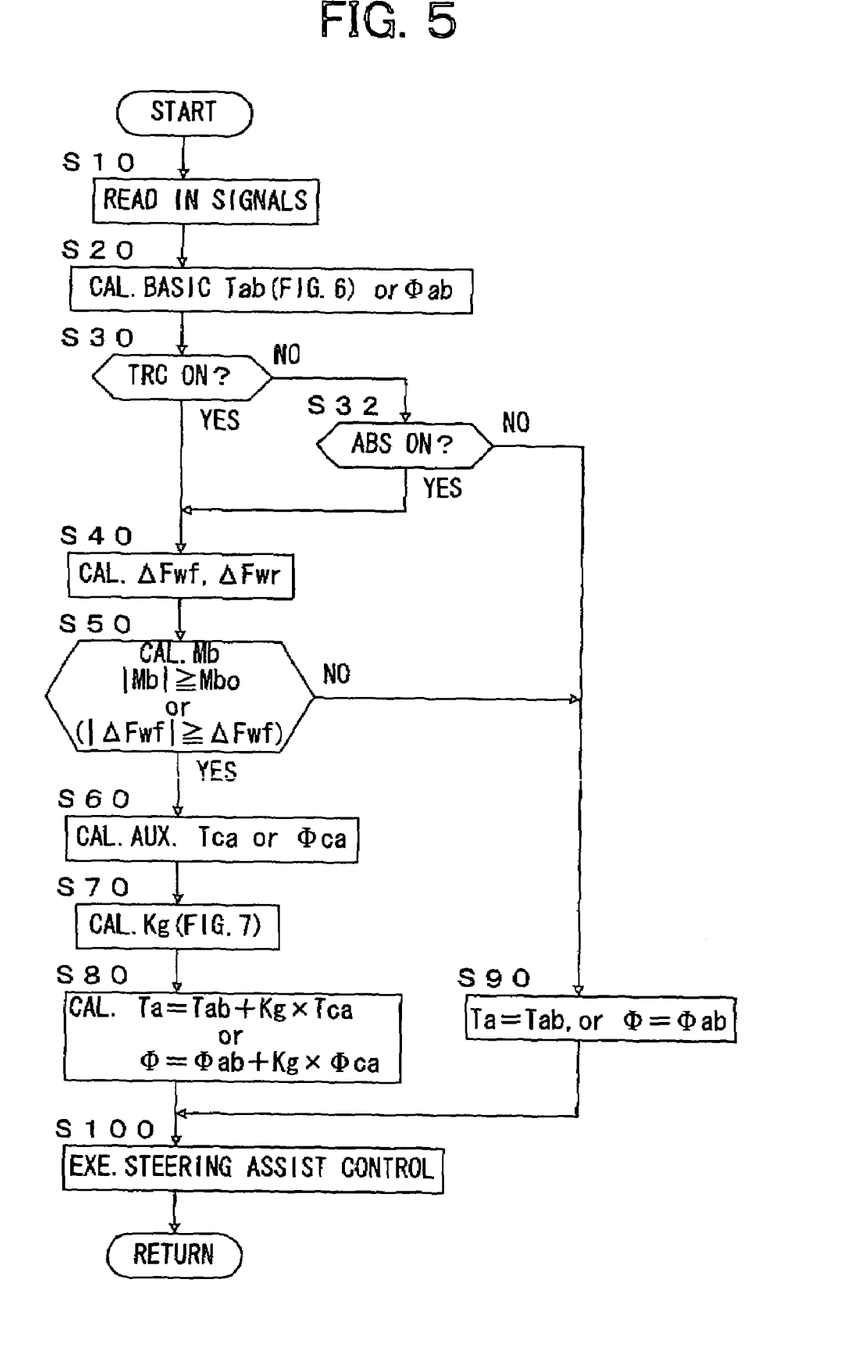
FIG. 5 is a flowchart showing a steering assist control routine executed in the preferred embodiments in the vehicles in FIGS. 3 and 4 according to the present invention.

As described, the vehicle is provided with two electronic controllers 28 and 48. Electronic controller 48 conducts a calculation of the steering assist torque Ta, as defined in the expression (1), according to a flowchart as shown in FIG. 5, using signals fed from various sensors as described below, and, based upon the result of the calculation, sends a command to the electronic controller 28 controlling the power steering apparatus 16. Both the electronic controllers incorporate a microcomputer which may be of an ordinary type including a central processor unit, a read only memory, a random access memory, input and output port means and a common bus interconnecting these elements (not shown).

The electronic controller 48 is supplied with signals of wheel velocities Vwi (i=fl, fr, rl and rr are front left, front right, rear left and rear right, respectively), detected with wheel velocity sensors 50FL–50RR mounted on the corresponding wheels 10FL–10RR; signals of wheel cylinder pressures Pi, detected with Pressure sensors 52FL–52FR mounted on the corresponding wheel cylinders 42FL–42RR; a signal of steering torque Ts, detected with a torque sensor 56 mounted on a steering shaft 54; a signal of a vehicle velocity Vb, detected with a vehicle speed sensor 58; and a signal of a yaw rate γ, detected with a yaw rate sensor 60.

For the wheels of the vehicle, TRC and ABS control may be executed if a driving slip on either of the driven wheels 10FL and 10FR is excessive (larger than a reference value) during accelerating of the vehicle and if a braking slip on either of the wheels 10FL–10RR is excessive (larger than a reference value) during braking of the vehicle, respectively. In these control operations, the controller 48 calculates the slips on the individual wheels based upon the vehicle velocity Vb and wheel velocities Vwi. Then, as long as conditions in which TRC or ABS control is required continue, the hydraulic circuit 40 is fed commands from the controller 48 for adjusting the braking pressures on the individual wheels so as to ensure an appropriate longitudinal road reaction force on each wheel.

Figure 4:
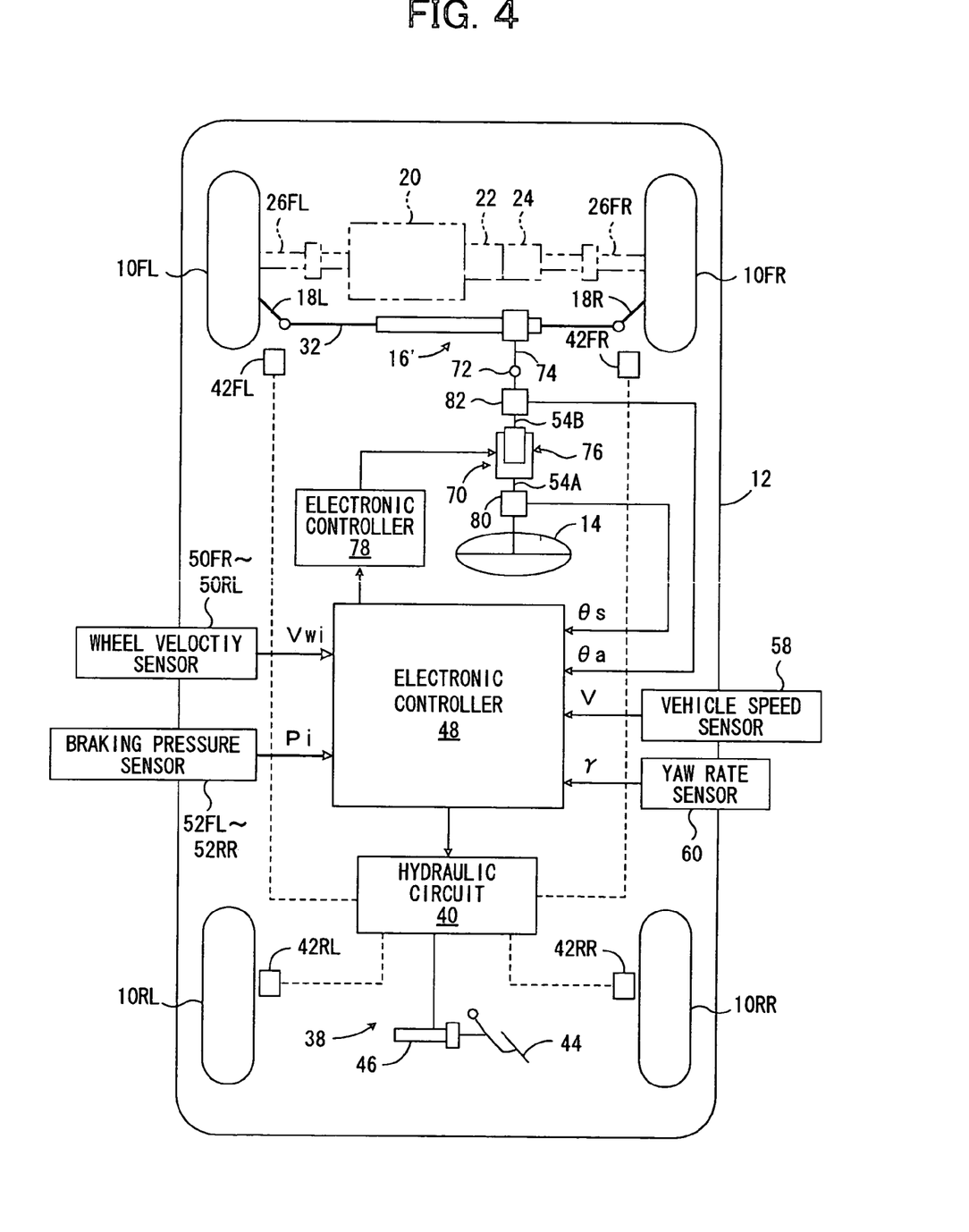
FIG. 4 is a diagrammatical view of another embodiment of a four wheeled, front drive vehicle incorporating a vehicle steering control device controlling the steering angle according to the present invention.

FIG. 4 diagrammatically shows another embodiment of a four-wheel, front drive vehicle incorporating a steering control device according to the present invention, in which a steering angle is controlled for improving a steering characteristic. In this embodiment, a hydraulic power steering apparatus 16' and a turning angle varying apparatus 70 connecting an upper steering shaft 54A and a lower steering shaft 54B are provided, instead of the electric power steering apparatus 16 and steering shaft 54 in FIG. 3. The upper steering shaft 54A is connected to the steering wheel 14, and the lower steering shaft 54B is connected to a pinion shaft 74 via a joint 72. Further, to the electronic controller 48, signals of rotational angles θs and θa of the upper and lower steering shafts 54A and 54B, detected with steering angular sensors 80 and 82, respectively, instead of the signal of torque Ts detected with the torque sensor 56. The electronic controller 28 is fed with a command by the controller 48 and controls the turning angle varying apparatus 70, equipped with an electric motor 76 for adding the auxiliary steering angle component Φca, multiplied by the gain Kg, to the steering angle component Φab. Accordingly, the hydraulic power steering system 16' with the turning angle varying apparatus 70 and controller 28 construct an active steering apparatus.

The controller 48 conducts a calculation of the steering angle Φ, as defined in the expression (2), according to a flowchart as shown in FIG. 5, using signals fed from various sensors including the signal of the upper steering shaft 54A, and, based upon the result of the calculation, the controller 28 adjusts the angular position of the lower steering shaft 54B to set the steering angle Φ on the steered wheels 10FL and 10FR. The signal θa may be used for monitoring an actual steering angle on the steered wheels and for returning it back to the neutral position after the modification of the steering characteristic according to the present invention. The other structure and components in FIG. 4 are similar to those in FIG. 3.

In FIG. 5, there is shown an exemplary flowchart executed in the steering control device (in the controller 48) in FIG. 3 or 4. The control according to the flowchart may be started by a closure of an ignition switch (not shown in FIGS. 3 and 4) and cyclically repeated at a cycle time such as tens of milli-seconds during the operation of the vehicle. In the following processes, the steering angle Φ, Φab and Φca, yaw rate γ, torque Ts, Ta, Tab and Tca and yaw moment Mb in the rightward direction are defined as positive. A road reaction force in the acceleration direction is defined as positive.

Figure 6:
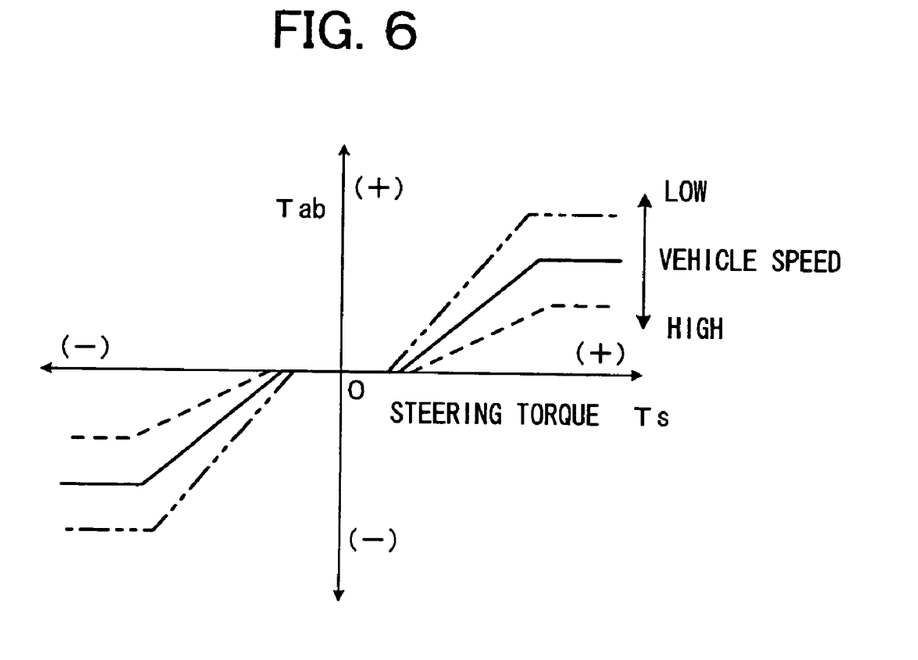
FIG. 6 shows a map of the basic steering assist torque as a function of the torque of rotating the steering wheel and vehicle velocity used in step 20 of the flowchart of FIG. 5.

Firstly, in step 10, the signals shown in FIG. 3 or 4 are read in. Then, in step 20, there is calculated the basic steering assist torque Tab (in FIG. 3) or steering angle component Φab (in FIG. 4). In the calculation of Tab in the vehicle of FIG. 3, a map as shown in FIG. 6 may be used, in which a target basic steering assist torque is determined as a function of the steering torque Ts on the steering shaft 54 and vehicle velocity Vb. The steering angle component Φab may be determined by the angler position θs of the upper steering shaft 54A. Without any rotation of the steering wheel by the driver, the basic steering assist torque Tab and steering angle component Φab will be zero.

Then, in steps 30 and 32, it is judged if either of TRC and ABS control is being operated. When the vehicle is accelerated and an acceleration slip on at least either of the front (driven) wheels exceeds over a reference value, TRC will be operated to increase the braking force i.e. braking pressure on the corresponding wheel for preventing any acceleration slip from being excessive. On the other hand, when the vehicle is decelerated and a deceleration or braking slip on at least either of the wheels exceeds over a reference value, ABS will be operated to decrease the braking pressure for on the corresponding wheel. Both TRC and ABS control is well known in the art, and a conventional manner of those control process may be employed in the present invention. When TRC or ABS is operated, the process will go to step 40 for calculating differences between longitudinal road reaction forces on the left and right wheels. When neither of these control is operated, however, the steering assist torque may be set as Ta=Tab (in FIG. 3), or the steering angle, as Φ=Φab (in FIG. 4), without modification of the steering characteristic based upon the road reaction forces on the wheels (in Step 90).

In this connection, it should be noted that the modification of the steering characteristic according to the present invention may be done irrespective of the operations of TRC and ABS, so that steps 30 and 32 may be omitted if desired. Alternatively, if the modification of the steering characteristic according to the present invention is desired only during accelerating a vehicle, only step 30 may be executed and in absence of TRC operation, step 90 may be executed to set Ta=Tab (in FIG. 3) or Φ=Φab (in FIG. 4).

In step 40, for estimating the auxiliary steering assist torque Tca or auxiliary steering angle component Φca, first, the differences between the left and right longitudinal road reaction forces for the front wheels, ΔFwf, and rear wheels, ΔFwr, are calculated. The road reaction forces on the wheels can be estimated from the braking pressures Pfl–Prr applied to the corresponding wheel cylinders 52FL–52RR, and therefore, the differences between the road reaction forces ΔFwf and ΔFwr may be estimated, using brake pressure differences of the front pair, ΔPf, and the rear pair, ΔPr as follows:

$$\Delta Fwf = Kpf \times \Delta Pf = Kpf \times (Pfr - Pfl) \quad (3)$$

$$\Delta Fwr = Kpr \times \Delta Pr = Kpr \times (Prr - Prl) \quad (4)$$

where Kpf and Kpr are positive constant factors converting a braking pressure Pwi to a braking force Fbi for the front and rear wheels, respectively.

With respect to the derivation of the expressions (3) and (4), the total longitudinal road reaction force (Fti) on a wheel is given by a sum of components in the acceleration direction, Fai, and deceleration direction, –Fbi. The component in the acceleration direction is applied only from the engine 20 via transmission 22, etc., to both left and right front wheels with an equal amount because of the structure from the engine to the front wheel, i.e. Fafl=Fafr (see FIG. 3 or 4) (No acceleration component is applied to the rear non-driven wheels.). Thus, taking into account that a yaw moment in rightward turning is defined as positive, the total force difference from the left (Ftfl) to right wheels (Ftfr) is given by: ΔFwf=Ftfl–Ftfr=(Fafl–Fbfl)–(Fafr–Fbfr)=Fbfr–Fbfl=Kpfx(Pfr–Pfl); and ΔFwr=(0–Fbrl)–(0–Fbrr)=Fbrr–Fbrl=Kpfx(Prr–Prl).

During acceleration of the vehicle under TRC operation, only the difference of the traction forces on the front (driven) wheels is significant. No braking pressure is applied to the wheel cylinders of the rear non-driven wheels so that ΔFwr=0.

Subsequently, in step 50, a yaw moment Mb, around the centroid of the vehicle body, induced by the differences of the road reaction forces, ΔFwf and ΔFwr, is calculated in a conventional manner, and it is judged if the absolute value of the resultant yaw moment Mb is larger than a reference value Mb0. If the answer is No, step 90 may be executed to set Ta=Tab (in FIG. 3) or Φ=Φab (in FIG. 4) without modification of the steering characteristic based upon the road reaction forces on the wheels. If the modification of the steering characteristic is executed only during acceleration where always ΔFwr=0, the absolute value of ΔFwf may be compared with a reference value Fwf0, instead of the yaw moment Mb.

Then, in step 60, the auxiliary steering assist torque Tca or the auxiliary steering angle component Φca is calculated. The auxiliary steering assist torque Tca may be given by:

$$Tca = Kca \times Mb \text{ (in FIG. 3)} \quad (5)$$

where Kca is a negative factor because Tca should be applied in the direction opposite to Mb. If step 60 is executed only during acceleration, Tca may be given by:

$$Tca = Kca' \times \Delta Fwf \quad (5a)$$

where Kca' is also a negative factor.

Similarly, the auxiliary steering angle component Φca is determined as a function of the yaw moment Mb or the force difference ΔFwf, the sign of which function is opposite to Mb or ΔFwf. For the determination of Φca, any map (not shown) obtained experimentally and/or theoretically may be used in a manner realized by one of ordinary skill in the art.

Then, in step 70, the gain Kg is determined as a function of an index of the vertical load shift between the left and right wheels or the degree of turning, using a map as shown in FIG. 7, in which, as the index, the absolute value of the yaw rate γ of the vehicle body, detected with the yaw rate sensor 60. As seen from FIG. 7, Kg is reduced as the magnitude of the yaw rate γ increases. Thus, in the expressions (1) and (2), when the vehicle is running in the straight course, the steering characteristic is modified by Tca or Φca (if the yaw rate is near zero, Kg is almost one), but, the contributions of Tca and Φca are reduced during turning of the vehicle. Accordingly, the automatic steering assist control irrespective of the driver's steering operation is fully effective only in a straight course for compensating for the yaw moment induced by the left and right wheels being operated on different frictional road surfaces, while suppressed on a road having a uniform frictional coefficient even when the differences between the road reaction forces on the left and right wheels is generated during turning of the vehicle.

Kg to be used in the expressions (1) and (2) may be different from each other because of the difference of the amounts to be controlled. Further, different maps may be used during acceleration and deceleration of a vehicle. The map of Kg may be determined experimentally or theoretically in any manner which may be realized by one of ordinary skill in the art.

Then, in step 80, the steering assist torque Ta or steering angle Φ is calculated according to the expression (1) or (2), and there is executed in step 100 the steering assist control for the electric power steering apparatus 16 in FIG. 3 or the active steering apparatus (the hydraulic power steering apparatus 16' and turning angle varying apparatus 70) in FIG. 4 through the controller 28 according to Ta or Φ resulting from steps 80 or 90.

In the above embodiment, the longitudinal road reaction forces reacted on the wheels may be obtained by any ways other than the estimation from the braking pressures. For instance, torque detected on a wheel shaft with a torque sensor, an output of driving and braking forces for a wheel from a motor in a wheel-in-motor vehicle, etc. may be used.

Further, Kg may be a function of parameters of any vehicle conditions and those controlled by the driver, such as a lateral acceleration, an angler position of the steering wheel, its time differential, the difference between the vertical loads on the left and right wheels and a combination thereof. As described above, during deceleration of a vehicle, the auxiliary steering assist torque against the yaw moment induced by the braking forces is directed in the same direction as the yaw moment required for turning the vehicle head along a curved course. Thus, the contribution of the auxiliary components Tca or Φca may be raised up during deceleration relative to during acceleration as shown by a broken line in FIG. 7.

The steering control device according to the present invention may be employed in a rear drive vehicle and a four wheel drive vehicle.

Although the present invention has been described in detail with respect to preferred embodiments thereof and some partial modifications thereof, it will be apparent for those skilled in the art that other various modifications are possible with respect to the shown embodiments within the scope of the present invention.

The invention claimed is:

1. A device for controlling a steering characteristic of a vehicle, the vehicle having a vehicle body, at least one pair of left and right wheels including at least one pair of left and right steered wheels, a steering wheel and a steering apparatus operated based upon a motion of the steering wheel and a control of the device, so as to enhance an effect of suppressing a change in a behavior of the vehicle body due to a difference between driving and braking forces on the left and right wheels, wherein:

the device makes an amount of controlling the steering characteristic smaller as an index indicating an amount of a shift of vertical loads between the left and right wheels is increased; and in the vehicle, a traction control is executed in which a braking force of a driven wheel of the wheels is controlled when either of acceleration slips on the driven wheels is excessive; the steering characteristic is controlled so as to enhance an effect of suppressing a change in a behavior of the vehicle due to a difference between driving forces on the left and right wheels; and the difference between the driving forces on the left and right wheels are estimated based upon a difference between the braking forces on the left and right driven wheels under the traction control for either of the driven wheels.

2. A device according to claim 1, wherein the amount of controlling the steering characteristic is controlled by controlling a steering assist torque.

3. A device according to claim 2, wherein the steering assist torque is controlled in a direction of reducing an effect of a yaw moment imparted on the vehicle body induced by the difference between the driving and braking forces of the left and right wheels.

4. A device according to claim 3, wherein the steering assist torque is controlled based upon a sum of a basic steering assist torque based upon steering torque and an auxiliary steering assist torque produced in a direction of reducing the effect of the yaw moment imparted on the vehicle body induced by the difference between the driving and braking forces of the left and right wheels; and the magnitude of the auxiliary steering assist torque is reduced as the index indicating an amount of a shift of vertical loads between the left and right wheels increases.

5. A device according to claim 1, wherein the amount of controlling the steering characteristic is controlled by controlling a steering angle of a steered wheel.

6. A device according to claim 5, wherein the vehicle has an active steering apparatus steering the steered wheels irrespective of a steering operation of a driver; and, under control of the steering control device, the active steering means steers the steered wheels in a direction of reducing an effect of a yaw moment imparted on the vehicle body induced by the difference between the driving and braking forces of the left and right wheels.

7. A device according to claim 6, wherein the steering control device reduces the magnitude of a control amount of steering of the steered wheel of the active steering apparatus as the index indicating an amount of a shift of vertical loads between the left and right wheels increases.

8. A device according to claim 1, wherein the index indicating an amount of a shift of vertical loads between the left and right wheels is selected from a group of a yaw rate of the vehicle body, a lateral acceleration of the vehicle body, a steering angle, a difference between the vertical loads on the left and right wheels and a combination thereof.

9. A device according to claim 1, wherein, in the vehicle, an anti-skid control is executed in which a braking pressure of a wheel is controlled when either of braking slips of the wheels is excessive; the steering characteristic is controlled so as to enhance an effect of suppressing a change in a behavior of the vehicle due to a difference between braking forces on the left and right wheels; and the difference between the braking forces on the left and right wheels are estimated based upon a difference between the braking pressures on the left and right wheels under the anti-skid control for either of the wheels.

10. A device according to claim 1, wherein the vehicle has a driving apparatus and at least a front wheel driven by the driving apparatus.

11. A device for controlling a steering characteristic of a vehicle, the vehicle having a vehicle body, at least one pair of left and right wheels including at least one pair of left and right steered wheels, a steering wheel and a steering apparatus operated based upon a motion of the steering wheel and a control of the device, so as to enhance an effect of suppressing a change in a behavior of the vehicle body due to a difference between driving and braking forces on the left and right wheels, wherein:

the device makes an amount of controlling the steering characteristic smaller as an index indicating an amount of a degree of turning of the vehicle is increase; and in the vehicle, a traction control is executed in which a braking force of a driven wheel of the wheels is controlled when either of acceleration slips on the driven wheels is excessive: the steering characteristic is controlled so as to enhance an effect of suppressing a change in a behavior of the vehicle due to a difference between driving forces on the left and right wheels; and the difference between the driving forces on the left and right wheels are estimated based upon a difference between the braking forces on the left and right driven wheels under the traction control for either of the driven wheels.

* * * * *